US008835053B2

United States Patent
Sung et al.

(10) Patent No.: US 8,835,053 B2
(45) Date of Patent: Sep. 16, 2014

(54) NEGATIVE ACTIVE MATERIAL CONTAINING AN INTERMETALLIC COMPOUND OF SILICON AND A FIRST METAL AND A METAL MATRIX CONTAINING COPPER AND ALUMINUM FOR RECHARGEABLE LITHIUM BATTERY AND RECHARGEABLE LITHIUM BATTERY CONTAINING THE NEGATIVE ACTIVE MATERIAL

(75) Inventors: Min-Seok Sung, Yongin-si (KR); Goo-Jin Jeong, Yongin-si (KR); Yong-Mook Kang, Yongin-si (KR); Sang-Min Lee, Yongin-si (KR); Wan-Uk Choi, Yongin-si (KR); Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 770 days.

(21) Appl. No.: 12/050,864

(22) Filed: Mar. 18, 2008

(65) Prior Publication Data

US 2008/0233480 A1 Sep. 25, 2008

(30) Foreign Application Priority Data

Mar. 21, 2007 (KR) .................. 10-2007-0027776

(51) Int. Cl.
*H01M 4/134* (2010.01)
*H01M 4/1395* (2010.01)
*H01M 4/38* (2006.01)
*H01M 4/40* (2006.01)

(52) U.S. Cl.
CPC ............. *H01M 4/38* (2013.01); *H01M 4/405* (2013.01); *Y02E 60/12* (2013.01)
USPC ........ 429/220; 429/218.1; 429/221; 429/223; 429/224; 429/231.5; 429/231.6

(58) Field of Classification Search
USPC ........... 429/220, 218.1, 221, 223, 224, 231.5, 429/231.6
See application file for complete search history.

(56) References Cited

U.S. PATENT DOCUMENTS

| 5,885,381 | A | 3/1999 | Mitose et al. |
| 6,265,111 | B1 * | 7/2001 | Bito et al. ................ 429/231.95 |
| 6,569,194 | B1 | 5/2003 | Pelton |

(Continued)

FOREIGN PATENT DOCUMENTS

| CN | 1419303 A | 5/2003 |
| CN | 1614799 A | 5/2005 |

(Continued)

OTHER PUBLICATIONS

Iijima et al., Machine translation of jP 2005011650 A, Jan. 2005.*

(Continued)

*Primary Examiner* — Sean P Cullen
(74) *Attorney, Agent, or Firm* — Christie, Parker & Hale, LLP

(57) ABSTRACT

Negative active materials and rechargeable lithium batteries including the negative active materials are provided. The negative active material includes an intermetallic compound of Si and a metal, and a metal matrix including Cu and Al. The negative active material may provide a rechargeable lithium battery having high capacity and excellent cycle-life and cell efficiency.

20 Claims, 3 Drawing Sheets

(56) References Cited

U.S. PATENT DOCUMENTS

| | | | |
|---|---|---|---|
| 6,730,434 | B1 | 5/2004 | Kawakami et al. |
| 6,881,518 | B2 | 4/2005 | Kaminaka et al. |
| 7,097,938 | B2 | 8/2006 | Yamada et al. |
| 7,223,498 | B2 | 5/2007 | Matsubara et al. |
| 7,285,359 | B2 | 10/2007 | Yamamoto et al. |
| 2003/0134198 | A1 | 7/2003 | Sawa et al. |
| 2004/0033419 | A1 | 2/2004 | Funabiki |
| 2004/0248011 | A1 | 12/2004 | Asao et al. |
| 2005/0031957 | A1 | 2/2005 | Christensen et al. |
| 2005/0153208 | A1 | 7/2005 | Konishiike et al. |
| 2006/0040182 | A1 | 2/2006 | Kawakami et al. |
| 2006/0121351 | A1 | 6/2006 | Sato et al. |
| 2006/0147802 | A1* | 7/2006 | Yasuda et al. ............ 429/233 |
| 2007/0122702 | A1 | 5/2007 | Sung et al. |

FOREIGN PATENT DOCUMENTS

| | | |
|---|---|---|
| CN | 1639889 A | 7/2005 |
| CN | 1842932 A | 10/2006 |
| CN | 1930726 A | 3/2007 |
| EP | 1 028 476 A1 | 8/2000 |
| JP | 59-020971 | 2/1984 |
| JP | 2000-311681 | 11/2000 |
| JP | 2001-15102 | 1/2001 |
| JP | 2001-93524 | 4/2001 |
| JP | 2002-093415 | 3/2002 |
| JP | 2003-257417 | 9/2003 |
| JP | 2003-272613 | 9/2003 |
| JP | 2004-006206 | 1/2004 |
| JP | 2004-095469 | 3/2004 |
| JP | 2004-296412 | 10/2004 |
| JP | 2004-311429 | 11/2004 |
| JP | 2005-011650 | 1/2005 |
| JP | 2005-078999 | 3/2005 |
| JP | 2005-085526 | 3/2005 |
| JP | 2005-100876 | 4/2005 |
| JP | 2005-116390 | 4/2005 |
| JP | 2005-203343 | 7/2005 |
| JP | 2005-294068 | 10/2005 |
| JP | 2007-149685 | 6/2007 |
| KR | 10-2000-0033684 | 6/2000 |
| KR | 10-2001-0031868 | 4/2001 |
| KR | 10-2001-0054903 | 7/2001 |
| KR | 10-2001-0055503 | 7/2001 |
| KR | 10-2004-0100058 | 12/2004 |
| KR | 10-2005-0090220 | 9/2005 |
| KR | 10-0536251 | 12/2005 |
| KR | 10-2007-0056323 | 6/2007 |
| KR | 10-2007-0056765 | 6/2007 |
| WO | WO 00/17949 | 3/2000 |
| WO | WO 00/60691 A1 | 10/2000 |
| WO | WO 01/52337 A1 | 7/2001 |
| WO | WO 02/103822 A2 | 12/2002 |
| WO | WO 2004/086539 | 10/2004 |
| WO | WO 2005/018026 A2 | 2/2005 |
| WO | WO 2005/048381 A1 | 5/2005 |
| WO | WO 2005/124901 A1 | 12/2005 |

OTHER PUBLICATIONS

Iijima et al., Human translation of JP 2005-011650 A, Jan. 2005.*
Patent Abstracts of Japan, Publication 2001-093524, Published Apr. 6, 2001, for Sato, et al.
Korean Patent Abstracts, Publication 1020070056323 A, Published Jun. 4, 2007, for Sung, et al.
European Search Report dated Jul. 1, 2008, for corresponding European Application No. 08153062.8.
European Search Report dated Mar. 20, 2008 for European Patent application 07121570.1.
Japanese Office action dated Sep. 14, 2010 for Japanese Patent application 2007-164317.
U.S. Office action dated Oct. 13, 2009, for cross reference U.S. Appl. No. 11/987,135.
U.S. Office action dated Apr. 14, 2010, for cross reference U.S. Appl. No. 11/987,135.
Patent Abstracts of Japan and English machine translation of Japanese Publication 2005-0100876, listed above, 19 pages.
Patent Abstracts of Japan and English machine translation of Japanese Publication 2005-078999, listed above, 15 pages.
Patent Abstracts of Japan and English machine translation of Japanese Publication 2005-085526, listed above, 11 pages.
Patent Abstracts of Japan and English machine translation of Japanese Publication 2005-294068, listed above, 10 pages.
English machine translation of Korean Publication 10-2007-056765, listed above, 22 pages.
U.S. Office action dated Nov. 22, 2011, for cross reference U.S. Appl. No. 12/053,417, 19 pages.
U.S. Office action dated Feb. 14, 2012, for cross reference U.S. Appl. No. 12/049,136, 23 pages.
U.S. Office action dated Apr. 21, 2010, for cross reference U.S. Appl. No. 11/604,712, (14 pages).
European Search Report dated Feb. 5, 2009 for European Patent application 06124957.9, (7 pages).
KIPO Office action dated Aug. 31, 2009 for Korean Patent application 10-2005-0114829, (7 pages).
JPO Office action dated Feb. 9, 2010 for Japanese Patent application 2006-317645, (2 pages).
U.S. Office action dated Jun. 6, 2012, for cross reference U.S. Appl. No. 12/049,136 (19 pages).
U.S. Office action dated Jun. 20, 2012, for cross reference U.S. Appl. No. 12/053,417 (14 pages).
U.S. Office action dated Oct. 2, 2009, for cross reference U.S. Appl. No. 11/604,712, 14 pages.
U.S. Office action dated May 10, 2011, for cross reference U.S. Appl. No. 12/053,417, 17 pages.
Patent Abstracts of Japan, and English machine translation for Japanese Publication 2001-015102, listed above, 69 pages.
Japanese Office action dated May 24, 2011, for Japanese Patent application 2008-073437, 3 pages.
U.S. Office action dated Jul. 30, 2013, for cross reference U.S. Appl. No. 12/053,417 (12 pages).
U.S. Office action dated Sep. 10, 2013, for cross reference U.S. Appl. No. 12/049,136 (21 pages).
U.S. Office action dated Dec. 24, 2013, for cross reference U.S. Appl. No. 12/049,136 (17 pages).
U.S. Office action dated Mar. 4, 2014, for cross reference U.S. Appl. No. 12/049,136, (19 pages).
U.S. Office action dated Dec. 10, 2013, for cross reference U.S. Appl. No. 12/053,417, (14 pages).
Somsen, Ch., et al., *Influence of iridium on the martensitic transformation in Ni—Ti shape memory alloys*, (2004), Material Science and Engineering, vol. 378, pp. 170-174.
Fuentes, J., et al., *Phase Change Behavior of Nitinol Shape Memory Alloys*, (2002), Advanced Engineering Materials, vol. 4, No. 7, pp. 437-451.
Steckmann, H., et al., *Acoustoplastic effect in the shape memory alloy Ni—Ti—Re at ultrasonic frequency*, (1999), Ultrasonics, vol. 37, pp. 59-62.

* cited by examiner

NEGATIVE ACTIVE MATERIAL CONTAINING AN INTERMETALLIC COMPOUND OF SILICON AND A FIRST METAL AND A METAL MATRIX CONTAINING COPPER AND ALUMINUM FOR RECHARGEABLE LITHIUM BATTERY AND RECHARGEABLE LITHIUM BATTERY CONTAINING THE NEGATIVE ACTIVE MATERIAL

CROSS-REFERENCE TO RELATED APPLICATION

This application claims priority to and the benefit of Korean Patent Application No. 10-2007-0027776 filed in the Korean Intellectual Property Office on Mar. 21, 2007, the entire content of which is incorporated herein by reference.

BACKGROUND OF THE INVENTION

1. Field of the Invention

The present invention relates to negative active materials for rechargeable lithium batteries and rechargeable lithium batteries including the same.

2. Description of the Related Art

Rechargeable lithium batteries use materials that are capable of reversibly intercalating or deintercalating lithium ions as the positive and negative electrodes. Organic electrolyte solutions or polymer electrolytes may be used between the positive and negative electrodes. Rechargeable lithium batteries generate electrical energy by oxidation/reduction reactions occurring during intercalation/deintercalation of lithium ions at the positive and negative electrodes.

As positive active materials, chalcogenide compounds have been widely used. Composite metal oxides such as $LiCoO_2$, $LiMn_2O_4$, $LiNiO_2$, $LiNi_{1-x}CO_xO_2$ (0<x<1), $LiMnO_2$, and so on, have also been used.

Conventionally, lithium metals have been used as negative active materials for rechargeable lithium batteries. However, when using lithium metal, dendrites can form which can cause short circuits, which, in turn, can cause explosions. Therefore, carbonaceous materials, such as amorphous carbon and crystalline carbon, have recently been used as negative active materials in place of lithium metals. However, such carbonaceous materials impart capacity losses of from 5 to 30% during the first several cycles, which wastes lithium ions and prevents at least one active material from being fully charged and discharged. Therefore, carbonaceous negative active materials have poor energy densities.

In addition, recent research has shown that metal negative active materials such as Si, Sn, and so on, which supposedly have high capacities, impart irreversible capacity characteristics. Further, tin oxide is an alternative to carbonaceous negative active materials. However, as the metal negative active material is included at 30% or less, initial Coulomb efficiency is decreased. Further, as lithium is continuously intercalated and deintercalated to generate a lithium-metal alloy, the capacity is remarkably decreased and the capacity retention rate is remarkably deteriorated after 150 charge and discharge cycles, making it not commercially viable.

SUMMARY OF THE INVENTION

One embodiment of the present invention provides a negative active material for a rechargeable lithium battery having high capacity and excellent cycle-life and cell efficiency.

Another embodiment of the present invention provides a rechargeable lithium battery including the negative active material.

According to an embodiment of the present invention, a negative active material for a rechargeable lithium battery includes an intermetallic compound of Si and a metal, and a metal matrix including Cu and Al.

The metal of the intermetallic compound may be a metal capable of changing the eutectic point of an alloy including Si, Cu, and Al. The metal capable of changing the eutectic point may be selected from the group consisting of Ca, Cr, Co, Fe, Mn, Ni, Ti, Zr, and combinations thereof.

According to one embodiment, the negative active material is represented by the following Formula 1.

$$x(a\text{Si}\text{-}b\text{M})\text{-}y(c\text{Cu}\text{-}d\text{Al}) \qquad \text{Formula 1}$$

In Formula 1, y is 100 wt %, x ranges from about 30 to about 70 wt %, y ranges from about 30 to about 70 wt %, a+b is 100 wt %, a ranges from about 60 to about 99 wt %, b ranges from about 1 to about 40 wt %, c+d is 100 wt %, c ranges from about 70 to about 85 wt %, and d ranges from about 15 to about 30 wt %, and M is a metal capable of forming an intermetallic compound with Si and is selected from the group consisting of Ca, Cr, Co, Fe, Mn, Ni, Ti, Zr, and combinations thereof.

The intermetallic compound is present in the negative active material in an amount ranging from about 30 to about 70 wt %, and the metal matrix is present in an amount ranging from about 30 to about 70 wt %.

Si is present in the intermetallic compound in an amount ranging from about 60 to about 99 wt %, the metal capable of forming an intermetallic compound with Si is present in an amount ranging from about 1 to about 40 wt %.

In one embodiment, Cu is present in the metal matrix in an amount ranging from about 70 to about 85 wt %, and Al is present in an amount ranging from about 15 to about 30 wt %.

The intermetallic compound and the metal matrix form an alloy having a lamellar structure.

According to another embodiment of the present invention, a rechargeable lithium battery includes a negative electrode including the negative active material, a positive electrode including a positive active material capable of reversibly intercalating and deintercalating lithium ions, and an electrolyte.

DETAILED DESCRIPTION OF THE INVENTION

According to one embodiment of the present invention, a negative active material for a rechargeable lithium battery uses Si (which is being researched as a high-capacity negative active material). Since Si provides high battery capacity, it is being highlighted as a negative active material for rechargeable lithium batteries that require higher capacity. However, since negative active materials using Si have drastically expanded volumes, cracks can form during battery charging and discharging, thereby deteriorating the cycle life of the battery. This obstacle keeps Si from being commercially used as the negative active material in a battery.

Research has been conducted into pulverizing Si particles to address the volume expansion problem. However, Si particles are pulverized into fine particles by quenching, which requires complicated processes, such as quenching speed control, to obtain pulverized Si particles. Also, in Si—Al alloys including pulverized Si, Al reacts with lithium to thereby form a chemical compound. Further, other metals cannot be used because they react with Si or lithium ions to form a large amount of intermetallic compound.

In one embodiment of the present invention, a negative active material for a rechargeable lithium battery may be pulverized at a low quenching speed.

The negative active material according to one embodiment includes an intermetallic compound of Si and a metal, and a metal matrix including Cu and Al.

The Si is capable of providing high capacity, and is linked with a metal to form an intermetallic compound. The metal of the intermetallic compound does not react with the Cu—Al metal matrix, and can change the eutectic point of an alloy including Si, Cu, and Al. The metal capable of changing the eutectic point may be selected from the group consisting of Ca, Cr, Co, Fe, Mn, Ni, Ti, Zr, and combinations thereof. According to one embodiment, the metal capable of changing the eutectic point is Ca. Although the metal reacts with Si particles and forms an intermetallic compound, the metal is highly flexible at room temperature and thus may stably maintain the alloy structure when the lithium ions are intercalated/deintercalated.

Figure 1:
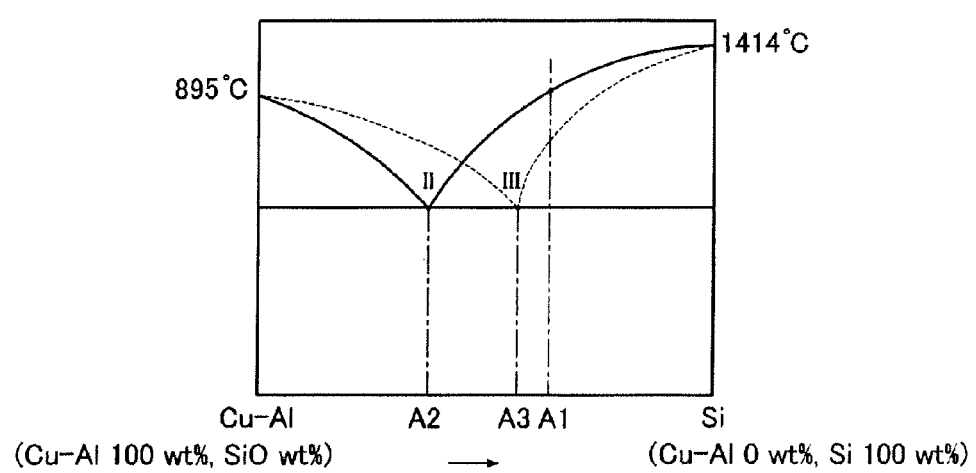
FIG. 1 is a graph showing a change in the eutectic point of a Si—Cu—Al alloy.

As used herein, the eutectic point is the temperature at which elements of a molten composition are simultaneously educed at a threshold ratio when the molten composition is cooled. In the embodiment of the present invention, the eutectic point of the alloy including Si, Cu, and Al is changed by adding a metal to the alloy. FIG. 1 is a graph showing a change in the eutectic point of Si—Cu—Al according to an embodiment of the present invention. In FIG. 1, the x axis is the composition of Si—Cu—Al (wt %) and the y axis is temperature (° C.).

Referring to FIG. 1, a liquid-phase A1 composition including Cu, Al, and Si is cooled down to a temperature I to thereby form a liquid-phase Cu—Al alloy and crystalline Si particles. When additional cooling is carried out, a crystalline Si—Cu—Al alloy where Si particles are surrounded by a Cu—Al metal matrix may be formed. However, Si particles that already exist in a crystalline form grow during the additional quenching and become too coarse to be pulverized.

However, since Si and Cu—Al are simultaneously educed in the crystalline forms at temperature II (which is the eutectic point), it is possible to prepare a Si—Cu—Al alloy in which Si particles are surrounded by a Cu—Al metal matrix by cooling the liquid-phase A2 composition including Si and Cu—Al down to temperature II. Although the A2 composition may be a crystalline Si—Cu—Al alloy having finer Si particles than the A1 composition, the A2 composition has small capacity because it includes fewer Si particles than the A1 composition.

The A3 composition has its eutectic point changed in the direction of the arrow by adding a metal (M) to the Si—Cu—Al alloy. In short, at temperature III of the A3 composition, the content of Si (which is an x value) is increased compared to the content at temperature II, and the crystal eduction temperature (which is a y value) is the same. Therefore, a crystalline Si—Cu—Al-M alloy having high Si content and fine Si particles may be acquired in the A3 composition. The negative active material according to one embodiment of the present invention is based on the change in the eutectic point and has large capacity, and the fine Si particles are surrounded by a highly flexible metal matrix. This suppresses volume expansion caused by charge and discharge, and prevents cycle-life from deteriorating even when volume is expanded.

According to one embodiment, the negative active material may be represented by the following Formula 1.

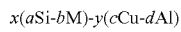

$$x(a\text{Si-}b\text{M})\text{-}y(c\text{Cu-}d\text{Al}) \qquad \text{Formula 1}$$

In Formula 1, x+y is 100 wt %, x ranges from about 30 to about 70 wt %, y ranges from about 30 to about 70 wt %, a+b is 100 wt %, a ranges from about 60 to about 99 wt %, b ranges from about 1 to about 40 wt %, c+d is 100 wt %, c ranges from about 70 to about 85 wt %, d ranges from about 15 to about 30 wt %, and M is a metal capable of forming an intermetallic compound with Si and is selected from the group consisting of Ca, Cr, Co, Fe, Mn, Ni, Ti, Zr, and combinations thereof.

Also, x is the wt % of the intermetallic compound in the entire alloy, and y is the wt % of the metal matrix in the entire alloy. In addition, a is the wt % of Si included in the intermetallic compound, and b is the wt % of the metal M included in the intermetallic compound.

The negative active material of the present invention may include the intermetallic compound in an amount ranging from about 30 to about 70 wt %. In one embodiment, for example, the intermetallic compound may be present in an amount ranging from about 40 to about 50 wt %. The metal matrix may be present in the negative active material in an amount ranging from about 30 to about 70 wt %. In one embodiment, for example, the metal matrix may be present in an amount ranging from about 50 to about 60 wt %. In other embodiments, the negative active material may include the intermetallic compound in amounts of about 35, about 40, about 45, about 50, about 55, about 60 or about 65 wt %, and the metal matrix may be present in amounts of about 35, about 40, about 45, about 50, about 55, about 60 or about 65 wt %. Within the aforementioned composition ranges, the negative active material provides large capacity and long cycle-life. Outside of the ranges, the negative active material may have a capacity too small to be useful, or volume expansion may not be suppressed enough such that cycle-life is deteriorated, which is undesirable.

The intermetallic compound may also include Si in an amount ranging from about 60 to about 99 wt %. In one embodiment, for example, Si is present in an amount ranging from about 80 to about 90 wt %. The intermetallic compound may include the metal M that forms the intermetallic compound with Si in an amount ranging from about 1 to about 40 wt %. In one embodiment, for example, the metal M is present in an amount ranging from about 10 to about 20 wt %. In other embodiments, the intermetallic compound may include Si in amounts of about 65, about 70, about 75, about 80, about 85, about 90 or about 95 wt %, and the metal M may be present in amounts of about 5, about 10, about 15, about 20, about 25, about 30, or about 35 wt %. Within the above-mentioned composition ranges, the eutectic point changes and the Si particles are pulverized to thereby improve the cycle-life of the negative active material, which is desirable. Outside of the ranges, however, the metal matrix grows too much to function as a matrix, which is undesirable.

According to another embodiment, the negative active material may further include a Si active metal. In other words, the intermetallic compound and the Si active metal may exist in a mixed form, and the metal matrix may surround the intermetallic compound and the Si active metal.

The metal matrix may include Cu in an amount ranging from about 70 to about 85 wt %. In one embodiment, for example, Cu is present in an amount ranging from about 72 to about 82 wt %. The metal matrix may include Al in an amount ranging from about 15 to about 30 wt %. In one embodiment, for example, Al is present in an amount ranging from about 18 to about 28 wt %. The metal matrix may include Cu in an amount ranging from about 75 to about 80 wt %, and Al in an amount ranging from about 20 to about 25 wt %. Outside of the above composition ranges, Si may react with Cu or Al to thereby form an intermetallic compound, thereby deteriorating the mechanical characteristic of the metal matrix preventing the metal matrix from functioning as a matrix, which is undesirable.

In one embodiment, the intermetallic compound is an alloy having a lamellar structure. In particular, the pulverized particles of the intermetallic compound are arrayed in rows to form a needle or plate structure, and the particles of the metal matrix are also arrayed in rows to form a needle or plate structure. The needles or plates of the intermetallic compound may be disposed and connected alternatingly with the needles or plates of the metal matrix to form a lamellar structure of the negative active material.

In one embodiment, the thickness of the needle- or plate-structured intermetallic compound may range from about 10 to about 300 nm. In one embodiment, for example, the thickness ranges from about 50 to about 200 nm. Within the above ranges, cracks do not occur in the alloy interface between the intermetallic compound and the metal matrix, which is desirable. Outside of the ranges, fine cracks occur in the alloy interface between the intermetallic compound and the metal matrix, and thus repeated charge/discharge may disconnect the electrical connection.

In one embodiment, the thickness of the needle- or plate-structured metal matrix may range from about 10 to about 300 nm. In one embodiment, for example, the thickness ranges from about 50 to about 200 nm. Within these ranges, the needle or plate structure may be maintained without deformation in the needle or plate structure even in the charging/discharging operation, thereby improving cycle-life. Outside of the ranges, contraction and expansion of Si cannot be effectively suppressed, which is undesirable.

Also, the length of the needle or plate-structured intermetallic compound may range from about 30 nm to about 2 μm. In one embodiment, for example, the length ranges from about 100 nm to about 1 μm. Within these ranges, the intermetallic compound is prevented from being destroyed by contraction and expansion, which is desirable. Outside of these ranges, the intermetallic compound may be destroyed during contraction and expansion, which is undesirable.

According to one embodiment, the length of the needle- or plate-structured metal matrix may range from about 30 nm to about 2 μm. In one embodiment, the length ranges from about 100 nm to about 1 μm. Within these ranges, it is possible to develop a battery with long cycle-life due to the electrical connection of the metal matrix when the intermetallic compound is destroyed. Outside of the ranges, volume expansion of the Si particles cannot be effectively suppressed.

According to one embodiment of the present invention, the negative active material having the above-described structure may be prepared by mixing Si, an additive metal, Cu, and Al to form a mixture, melting the mixture at a temperature about 1500° C. or greater, and solidifying the molten product by rapid ribbon solidification in which a molten product is sprayed onto a rotating copper roll.

Since the mixture is sufficiently molten as long as the temperature is about 1500° C. or greater, the melting temperature does not require an upper limit.

Herein, the quenching speed is the rotation rate of the copper roll, which ranges from about 2000 to about 5000 rpm in one embodiment. According to another embodiment, the quenching speed may range from about 4000 to about 5000 rpm. When the quenching speed is lower than about 2000 rpm, the Si-based active particles may be coarse. When the quenching speed is greater than about 5000 rpm, it may not be applied to mass production, which is undesirable. Besides rapid ribbon solidification, other solidification methods may be used as long as they provide sufficient quenching speed.

According to another embodiment of the present invention, a rechargeable lithium battery includes a negative electrode including the above-described negative active material, a positive electrode, and an electrolyte.

The negative electrode includes a current collector and a negative active material layer on the current collector. The negative active material layer includes the above-described negative active material.

The negative electrode may be fabricated by forming a negative active material composition by mixing a negative active material, a binder, and optionally a conductive agent in a solvent. The composition is then applied on a negative current collector, dried and compressed. The negative electrode manufacturing method is well known The binder acts to bind negative active material particles to each other and to bind negative active material particles to the current collector. Nonlimiting examples of suitable binders include polyvinylalcohol, carboxymethyl cellulose, hydroxypropylene cellulose, diacetylene cellulose, polyvinylchloride, polyvinylpyrrolidone, polytetrafluoroethylene, polyvinylidene fluoride, polyethylene, polypropylene, and combinations thereof.

Any electrically conductive material may be used as the conductive agent so long as it has electrical conductivity and chemical stability. Nonlimiting examples of suitable conductive agents include natural graphite, artificial graphite, carbon black, acetylene black, ketjen black, carbon fibers, metal powders, metal fibers including copper, nickel, aluminum, silver, and so on, and conductive materials such as polyphenylene derivatives.

One nonlimiting example of a suitable solvent is N-methylpyrrolidone.

The current collector may be selected from the group consisting of copper foils, nickel foils, stainless steel foils, titanium foils, nickel foams, copper foams, polymer substrates coated with conductive metals, and combinations thereof.

The positive electrode includes a current collector and a positive active material layer on the current collector. The positive active material layer includes a positive active material. The positive active material may include an active material capable of carrying out the electrochemical oxidation and reduction reactions, and may include any lithiated intercalation compound generally used in rechargeable lithium batteries. The positive active material may include a composite oxide including lithium and a metal selected from the group consisting of cobalt, manganese, nickel, and combinations thereof. Nonlimiting examples of suitable positive active materials include those represented by Formulae 2 to 26.

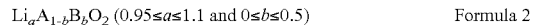

$Li_aA_{1-b}B_bO_2$ (0.95≤a≤1.1 and 0≤b≤0.5)    Formula 2

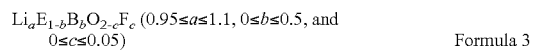

$Li_aE_{1-b}B_bO_{2-c}F_c$ (0.95≤a≤1.1, 0≤b≤0.5, and 0≤c≤0.05)    Formula 3

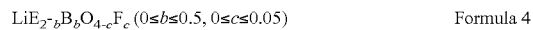

$LiE_{2-b}B_bO_{4-c}F_c$ (0≤b≤0.5, 0≤c≤0.05)    Formula 4

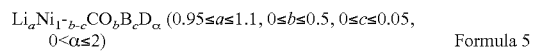

$Li_aNi_{1-b-c}Co_bB_cD_\alpha$ (0.95≤a≤1.1, 0≤b≤0.5, 0≤c≤0.05, 0<α≤2)    Formula 5

$$Li_aNi_{1-b-c}Co_bB_cO_{2-\alpha}F_\alpha \ (0.95 \le a \le 1.1, 0 \le b \le 0.5, 0 \le c \le 0.05, 0 < \alpha < 2) \quad \text{Formula 6}$$

$$Li_aNi_{1-b-c}Co_bB_cO_{2-\alpha}F_2 \ (0.95 \le a \le 1.1, 0 \le b \le 0.5, 0 \le c \le 0.05, 0 < \alpha < 2) \quad \text{Formula 7}$$

$$Li_aNi_{1-b-c}Mn_bB_cD_\alpha \ (0.95 \le a \le 1.1, 0 \le b \le 0.5, 0 \le c \le 0.05, 0 < \alpha \le 2) \quad \text{Formula 8}$$

$$Li_aNi_{1-b-c}Mn_bB_cO_{2-\alpha}F_\alpha \ (0.95 \le a \le 1.1, 0 \le b \le 0.5, 0 \le c \le 0.05, 0 < \alpha < 2) \quad \text{Formula 9}$$

$$Li_aNi_{1-b-c}Mn_bB_cO_{2-\alpha}F_2 \ (0.95 \le a \le 1.1, 0 \le b \le 0.5, 0 \le c \le 0.05, 0 < \alpha < 2) \quad \text{Formula 10}$$

$$Li_aNi_bE_cG_dO_2 \ (0.90 \le a \le 1.1, 0 \le b \le 0.9, 0 \le c \le 0.5, 0.001 \le d \le 0.1) \quad \text{Formula 11}$$

$$Li_aNi_bCo_cMn_dG_eO_2 \ (0.90 \le a \le 1.1, 0 \le b \le 0.9, 0 \le c \le 0.5, 0 \le d \le 0.5, 0.001 \le e \le 0.1) \quad \text{Formula 12}$$

$$Li_aNiG_bO_2 \ (0.90 \le a \le 1.1, 0.001 \le b \le 0.1) \quad \text{Formula 13}$$

$$Li_aCoG_bO_2 \ (0.90 \le a \le 1.1, 0.001 \le b \le 0.1) \quad \text{Formula 14}$$

$$Li_aMnG_bO_2 \ (0.90 \le a \le 1.1, 0.001 \le b \le 0.1) \quad \text{Formula 15}$$

$$Li_aMn_2G_bO_4 \ (0.90 \le a \le 1.1, 0.001 \le b \le 0.1) \quad \text{Formula 16}$$

$$QO_2 \quad \text{Formula 17}$$

$$QS_2 \quad \text{Formula 18}$$

$$LiQS_2 \quad \text{Formula 19}$$

$$V_2O_5 \quad \text{Formula 20}$$

$$LiV_2O_5 \quad \text{Formula 21}$$

$$LiIO_2 \quad \text{Formula 22}$$

$$LiNiVO_4 \quad \text{Formula 23}$$

$$Li_{(3-f)}J_2(PO_4)_3 \ (0 \le f \le 3) \quad \text{Formula 24}$$

$$Li_{(3-f)}Fe_2(PO_4)_3 \ (0 \le f \le 2) \quad \text{Formula 25}$$

$$LiFePO_4 \quad \text{Formula 26}$$

In Formulae 2 to 26, A is selected from the group consisting of Ni, Co, and Mn. B is selected from the group consisting of Al, Ni, CO, Mn, Cr, Fe, Mg, Sr, V, rare earth elements, and combinations thereof. D is selected from the group consisting of O, F, S, P, and combinations thereof. E is selected from the group consisting of Co, Mn, and combinations thereof. F is selected from the group consisting of F, S, P, and combinations thereof. G is selected from the group consisting of Al, Cr, Mn, Fe, Mg, La, Ce, Sr, V, and combinations thereof. Q is selected from the group consisting of Ti, Mo, Mn, and combinations thereof. I is selected from the group consisting of Cr, V, Fe, Sc, Y, and combinations thereof. J is selected from the group consisting of V, Cr, Mn, Co, Ni, Cu, and combinations thereof.

The lithiated intercalation compound may include a coating layer on its surface, or may be mixed with another lithiated intercalation compound having a coating layer. The coating layer may include at least one coating element-containing compound selected from the group consisting of coating element-containing hydroxides, coating element-containing oxyhydroxides, coating element-containing oxycarbonates, coating element-containing hydroxycarbonates, and combinations thereof. The coating element-containing compound may be amorphous or crystalline. Nonlimiting examples of suitable coating elements include selected from the group consisting of Mg, Al, Co, K, Na, Ca, Si, Ti, V, Sn, Ge, Ga, B, As, Zr, and combinations thereof. The coating layer may be formed by any coating method that does not have an unfavorable effect on the properties of the positive active material. Nonlimiting examples of suitable coating methods include spray coating, and dipping. Such coating methods are well known.

The positive electrode may be fabricated by forming a positive active material composition by mixing a positive active material, a binder, and a conductive agent in a solvent. The composition is then applied on a positive current collector.

The positive current collector may be aluminum, and the solvent may be N-methyl pyrrolidone, but they are not limited thereto.

The positive electrode manufacturing method is well known.

For the conductive agent, any electrically conductive material may be used so long as it does not cause a chemical change. Nonlimiting examples of suitable conductive agents include natural graphite, artificial graphite, carbon black, acetylene black, ketjen black, carbon fiber, metal powders or metal fibers including copper, nickel, aluminum, silver, and so on, and polyphenylene derivatives.

Nonlimiting examples of suitable binders include polyvinyl alcohol, carboxymethyl cellulose, hydroxypropylene cellulose, diacetylene cellulose, polyvinylchloride, polyvinylpyrrolidone, polytetrafluoroethylene, polyvinylidene fluoride, polyethylene, and polypropylene.

The solvent may be N-methylpyrrolidone, but it is not limited thereto.

The electrolyte includes a non-aqueous organic solvent and a lithium salt. The non-aqueous organic solvent acts as a medium for transmitting ions taking part in the electrochemical reaction of the battery.

The non-aqueous organic solvent may include a carbonate-based, an ester-based, an ether-based, a ketone-based, an alcohol-based, or aprotic solvent. Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Nonlimiting examples of suitable ester-based solvents include n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Nonlimiting examples of suitable ether-based solvents include dibutyl ether, tetraglyme, diglyme, dimethoxyethane, 2-methyltetrahydrofuran, tetrahydrofuran, and so on. Nonlimiting examples of suitable ketone-based solvents include cyclohexanone, and so on. Nonlimiting examples of suitable alcohol-based solvents include ethyl alcohol, isopropyl alcohol, and so on. Nonlimiting examples of suitable aprotic solvents include nitriles (such as X—CN where X is a C2 to C20 linear, branched, or cyclic hydrocarbon, a double bond, an aromatic ring, or an ether bond), amides (such as dimethylformamide), dioxolanes (such as 1,3-dioxolane), sulfolanes, and so on.

A single non-aqueous organic solvent may be used, or a mixture of solvents may be used. When a mixture of solvents is used, the mixture ratio may be controlled in accordance with the desirable battery performance.

The carbonate-based solvent may include a mixture of cyclic carbonates and linear carbonates. In one embodiment, the cyclic carbonates and linear carbonates are mixed together in a volume ratio ranging from about 1:1 to about 1:9, and when the mixture is used as an electrolyte, the electrolyte performance may be enhanced.

In addition, the electrolyte may further include mixtures of carbonate-based solvents and aromatic hydrocarbon-based solvents. The carbonate-based solvents and the aromatic hydrocarbon-based solvents may be mixed together in a volume ratio ranging from about 1:1 to about 30:1.

The aromatic hydrocarbon-based organic solvent may be represented by the following Formula 27:

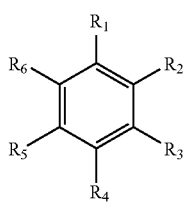

Formula 27

In Formula 27, each of $R_1$ to $R_6$ is independently selected from hydrogen, halogens, C1 to C10 alkyls, C1 to C10 haloalkyls, or combinations thereof.

Nonlimiting examples of suitable aromatic hydrocarbon-based organic solvents include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

The non-aqueous electrolyte may further include an additive such as vinylene carbonate or fluoroethylene carbonate for improving cycle-life of the battery. The additive may be used in an appropriate amount for improving cycle-life.

The lithium salt is dissolved in the non-aqueous organic solvent to supply lithium ions in the battery. The lithium salt performs the basic operation of the rechargeable lithium battery, and facilitates transmission of lithium ions between the positive and negative electrodes. Nonlimiting examples of suitable lithium salts include supporting electrolytic salts such as $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, LiI, and lithium bisoxalate borate. The lithium salt may be used in a concentration ranging from about 0.1 to about 2.0M. When the lithium salt concentration is less than about 0.1M, electrolyte performance may be deteriorated due to low electrolyte conductivity, whereas when the concentration is greater than about 2.0M, lithium ion mobility may be reduced due to an increase of electrolyte viscosity.

The rechargeable lithium battery may further include a separator as needed. The separator may include any material used in conventional lithium secondary batteries. Nonlimiting examples of suitable separator materials include polyethylene, polypropylene, polyvinylidene fluoride, and multi-layers thereof (such as a polyethylene/polypropylene double-layered separator, a polyethylene/polypropylene/polyethylene three-layered separator, and a polypropylene/polyethylene/polypropylene three-layered separator).

Figure 2:
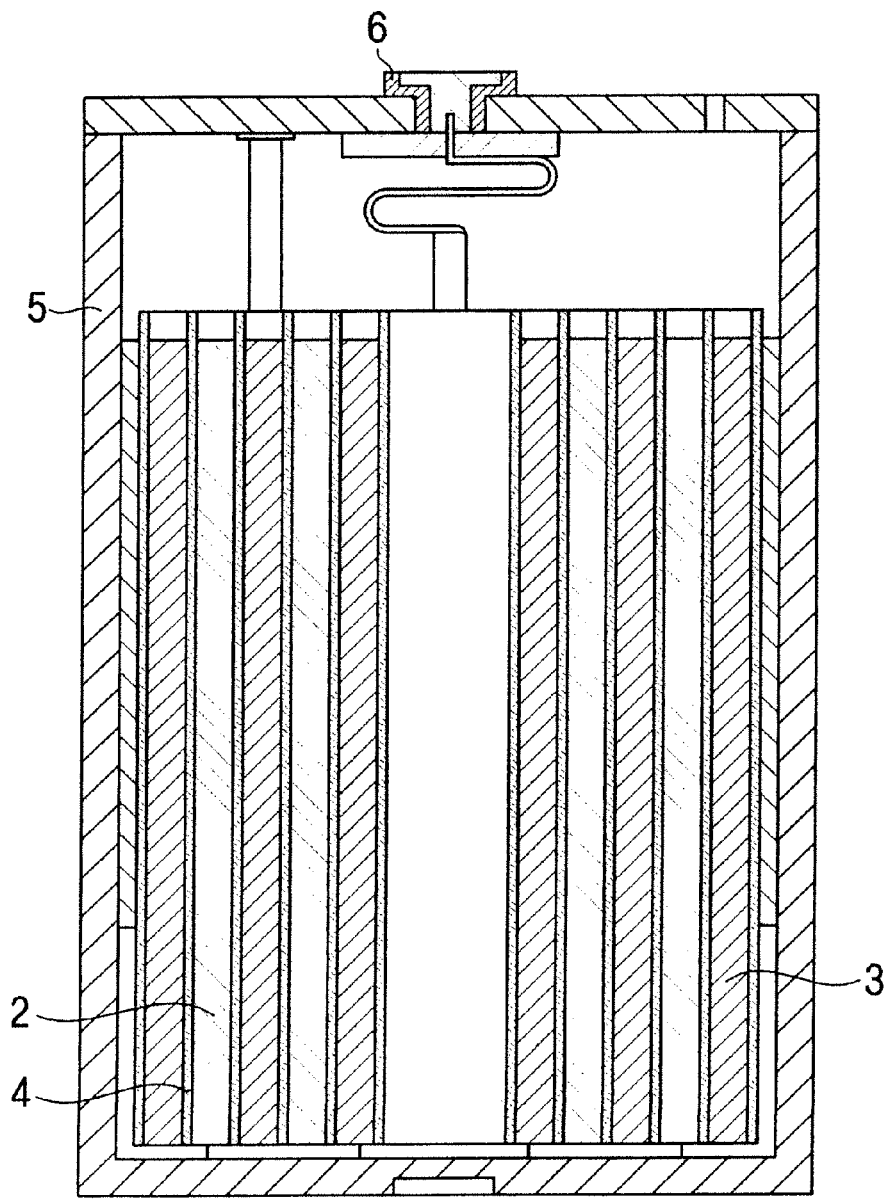
FIG. 2 is a cross-sectional perspective view of a rechargeable lithium battery according to an embodiment of the present invention.

FIG. 2 illustrates a rechargeable lithium battery having the above-mentioned structure according to one embodiment of the present invention. FIG. 2 shows a cylindrical lithium ion battery 1, which includes a negative electrode 2, a positive electrode 3, a separator 4 between the negative electrode 2 and the positive electrode 3, an electrolyte impregnating the separator 4, a battery case 5, and a sealing member 6 sealing the battery case 5.

The rechargeable lithium battery is not limited to the above-mentioned shape, and may take any suitable shape, such as a prism, a pouch, and so on.

The following examples are presented for illustrative purposes only and do not limit the scope of the present invention.

Example 1

A mother alloy including 34.2 wt % Si, 15.8 wt % Ca, 42.5 wt % Cu and 7.5 wt % Al was prepared under an argon gas atmosphere by arc melting. A negative active material for a rechargeable lithium battery was formed of the Si—Ca—Cu—Al alloy by rapid ribbon solidification. The quenching speed (i.e., rotating speed of the copper roll) was 3000 rpm. The prepared 50(68.4Si-31.6Ca)-50(85Cu-15Al) negative active material had a lamellar structure in which a needle- or plate-structured intermetallic compound (Si—Ca) having an average thickness of 35 nm and an average length of 200 nm was disposed alternatingly with a needle- or plate-structured metal matrix (Cu—Al) having an average thickness of 30 nm and an average length of 1 μm.

Example 2

A negative active material for a rechargeable lithium battery was prepared as in Example 1, except that the mother alloy included 24 wt % Si, 6 wt % Cr, 49 wt % Cu and 21 wt % Al to prepare a 30(80Si-20Cr)-70(70Cu-30Al) negative active material. The prepared negative active material had a lamellar structure, in which a needle- or plate-structured intermetallic compound (Si—Cr) having an average thickness of 150 nm and an average length of 1.25 μm was disposed alternatingly with a needle- or plate-structured metal matrix (Cu—Al) having an average thickness of 100 nm and an average length of 1.2 μm.

Example 3

A negative active material for a rechargeable lithium battery was prepared as in Example 1, except that the mother alloy included 29.7 wt % Si, 0.3 wt % Mn, 59.5 wt % Cu and 10.5 wt % Al to prepare a 30(99Si-1Mn)-70(85Cu-15Al) negative active material. The prepared negative active material had a lamellar structure, in which a needle- or plate-structured intermetallic compound (Si—Mn) having an average thickness of 35 nm and an average length of 300 nm was disposed alternately with a needle- or plate-structured metal matrix (Cu—Al) having an average thickness of 100 nm and an average length of 500 nm.

Example 4

A negative active material for a rechargeable lithium battery was prepared as in Example 1, except that the mother alloy included 40 wt % Si, 10 wt % Zr, 35 wt % Cu and 15 wt % Al to prepare a 50(80Si-20Zr)-50(70Cu-30Al) negative active material. The prepared negative active material had a lamellar structure, in which a needle- or plate-structured intermetallic compound (Si—Zr) having an average thickness of 150 nm and an average length of 650 nm was disposed alternately with a needle- or plate-structured metal matrix (Cu—Al) having an average thickness of 100 nm and an average length of 1 μm.

Example 5

A negative active material for a rechargeable lithium battery was prepared as in Example 1, except that the mother alloy included 49.5 wt % Si, 0.5 wt % Ti, 42.5 wt % Cu and 7.5 wt % Al to prepare a 50(99Si-1Ti)-50(85Cu-15Al) negative active material. The prepared negative active material had a lamellar structure, in which a needle- or plate-structured intermetallic compound (Si—Ti) having an average thickness of 35 nm and an average length of 2 μm was disposed alternately with a needle- or plate-structured metal matrix (Cu—Al) having an average thickness of 300 nm and an average length of 2 μm.

Example 6

A negative active material for a rechargeable lithium battery was prepared as in Example 1, except that the mother alloy included 39.6 wt % Si, 20.4 wt % Co, 32.5 wt % Cu and 7.5 wt % Al to prepare a 60(66Si-34Co)-40(81.255Cu-18.75Al) negative active material. The prepared negative active material had a lamellar structure, in which a needle- or plate-structured intermetallic compound (Si—Co) having an average thickness of 35 nm and an average length of 600 nm was disposed alternately with a needle- or plate-structured metal matrix (Cu—Al) having an average thickness of 300 nm and an average length of 2 μm.

Example 7

A negative active material for a rechargeable lithium battery was prepared as in Example 1, except that the mother alloy included 49.5 wt % Si, 0.5 wt % Fe, 42.5 wt % Cu and 7.5 wt % Al to prepare a 50(99Si-1Fe)-50(85Cu-15Al) negative active material. The prepared negative active material had a lamellar structure, in which a needle- or plate-structured intermetallic compound (Si—Fe) having an average thickness of 35 nm and an average length of 750 nm was disposed alternately with a needle- or plate-structured metal matrix (Cu—Al) having an average thickness of 300 nm and an average length of 1 μm.

Comparative Example 1

A ribbon-type negative active material for a rechargeable lithium battery was prepared by arc melting 40 wt % Si and 60 wt % Cu to prepare a Si—Cu alloy, and quenching the Si—Cu alloy by rapid ribbon solidification. The quenching speed was 3000 rpm.

Comparative Example 2

A ribbon-type negative active material for a rechargeable lithium battery was prepared by arc melting 50 wt % Si, 44.15 wt % Cu and 5.85 wt % Al to prepare a Si—Cu—Al alloy, and quenching the Si—Cu—Al alloy by rapid ribbon solidification. The quenching speed was 3000 rpm.

SEM Photograph

Figure 3:
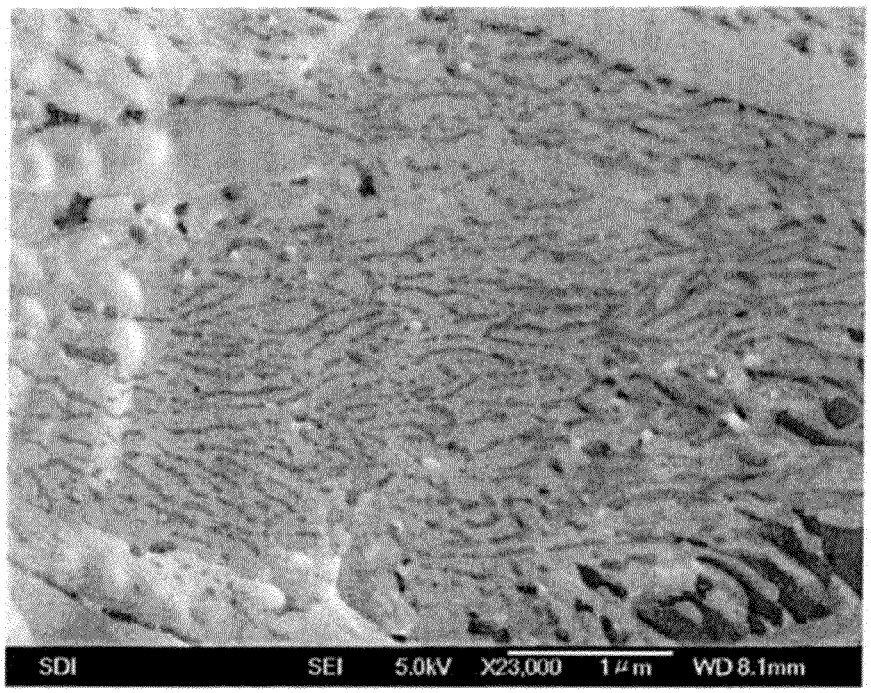
FIG. 3 is a SEM photograph (23,000-magnification) of the negative active material prepared according to Example 1.

FIG. 3 is a SEM photograph (23,000-magnification) of the CaSi$_2$—Cu—Al negative active material prepared according to Example 1. The structure of the Ca$_2$Si—Cu—Al negative active material, as shown in FIG. 3, has a lamellar structure in which the needle-structured intermetallic compound (Si—Ca) and the plate-structured metal matrix (Cu—Al) are disposed alternatingly with each other. Also, although the negative active material of Example 1 was prepared at a very low quenching speed, it may be seen from FIG. 3 that the average thicknesses of the intermetallic compound and the metal matrix were 35 nm and 30 nm, respectively, which are very fine.

The negative active materials according to the present invention have high capacity, long cycle-life, and excellent battery characteristics.

While the present invention has been illustrated and described with reference to certain exemplary embodiments, it will be understood by those of ordinary skill in the art that various changes and modifications may be made to the described embodiments without departing from the spirit and scope of the present invention as defined by the following claims.

What is claimed is:

1. A negative active material for a rechargeable lithium battery, comprising an alloy comprising:
an intermetallic compound of Si and a first metal M; and
a metal matrix comprising Cu and Al,
wherein the negative active material is represented by Formula 1:

$$x(a\text{Si}-b\text{M})\text{-}y(c\text{Cu}-d\text{Al}) \qquad \text{Formula 1}$$

wherein x+y is 100 wt %, x ranges from about 30 to about 70 wt %, y ranges from about 30 to about 70 wt %, a+b is 100 wt %, a ranges from about 85 to about 90 wt %, b ranges from about 10 to about 15 wt %, c+d is 100 wt %, c ranges from about 70 to about 85 wt %, d ranges from about 15 to about 30 wt %, and the first metal M comprises a metal capable of changing a eutectic point of an alloy including Si, Cu, and Al.

2. The negative active material of claim 1, wherein Cu is present in the metal matrix in an amount ranging from about 72 to about 82 wt %, and Al is present in the metal matrix in an amount ranging from about 18 to about 28 wt %.

3. The negative active material of claim 1, wherein the alloy comprising the intermetallic compound and the metal matrix has a lamellar structure.

4. The negative active material of claim 3, wherein the intermetallic compound is needle- or plate-structured having a thickness ranging from about 10 to about 300 nm.

5. The negative active material of claim 3, wherein the intermetallic compound is needle- or plate-structured having a length ranging from about 30 nm to about 2 μm.

6. The negative active material of claim 3, wherein the metal matrix is needle- or plate-structured having a thickness ranging from about 10 to about 300 nm.

7. The negative active material of claim 3, wherein the metal matrix is needle- or plate-structured having a length ranging from about 30 nm to about 2 μm.

8. The negative active material of claim 3, wherein the negative active material has the lamellar structure and is prepared at a quenching speed ranging from about 2000 to about 5000 rpm.

9. The negative active material of claim 1, wherein the first metal M is selected from the group consisting of Ca, Cr, Co, Fe, Mn, Ni, Ti, Zr, and combinations thereof.

10. The negative active material of claim 9, wherein the first metal M is Ca.

11. A rechargeable lithium battery comprising:
a negative electrode comprising a negative active material comprising an alloy comprising an intermetallic compound of Si and a first metal M, and a metal matrix comprising Cu and Al;
a positive electrode comprising a positive active material capable of reversibly intercalating/deintercalating lithium ions; and
an electrolyte,
wherein the negative active material is represented by Formula 1:

$$x(a\text{Si-}b\text{M})\text{-}y(c\text{Cu-}d\text{Al}) \quad \text{Formula 1}$$

wherein x+y is 100 wt %, x ranges from about 30 to about 70 wt %, y ranges from about 30 to about 70 wt %, a+b is 100 wt %, a ranges from about 85 to about 90 wt %, b ranges from about 10 to about 15 wt %, c+d is 100 wt %, c ranges from about 70 to about 85 wt %, d ranges from about 15 to about 30 wt %, and the first metal M comprises a metal capable of changing a eutectic point of an alloy including Si, Cu, and Al.

12. The rechargeable lithium battery of claim 11, wherein Cu is present in the metal matrix in an amount ranging from about 72 to about 82 wt %, and Al is present in the metal matrix in an amount ranging from about 18 to about 28 wt %.

13. The rechargeable lithium battery of claim 11, wherein the alloy comprising the intermetallic compound and the metal matrix has a lamellar structure.

14. The rechargeable lithium battery of claim 13, wherein the intermetallic compound is needle- or plate-structured having a thickness ranging from about 10 to about 300 nm.

15. The rechargeable lithium battery of claim 13, wherein the intermetallic compound is needle- or plate-structured having a length ranging from about 30 nm to about 2 μm.

16. The rechargeable lithium battery of claim 13, wherein the metal matrix is needle- or plate-structured having a thickness ranging from about 10 to about 300 nm.

17. The rechargeable lithium battery of claim 13, wherein the metal matrix is needle- or plate-structured having a length ranging from about 30 nm to about 2 μm.

18. The rechargeable lithium battery of claim 13, wherein the negative active material has the lamellar structure and is prepared at a quenching speed ranging from about 2000 to about 5000 rpm.

19. The rechargeable lithium battery of claim 11, wherein the first metal M is selected from the group consisting of Ca, Cr, Co, Fe, Mn, Ni, Ti, Zr, and combinations thereof.

20. The rechargeable lithium battery of claim 19, wherein the first metal M is Ca.

* * * * *